June 7, 1955 — I. NESSON — 2,709,825
CLIP FOR WIPER BLADES
Filed Dec. 8, 1951 — 2 Sheets-Sheet 1
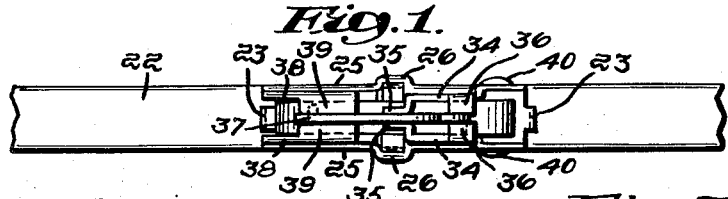
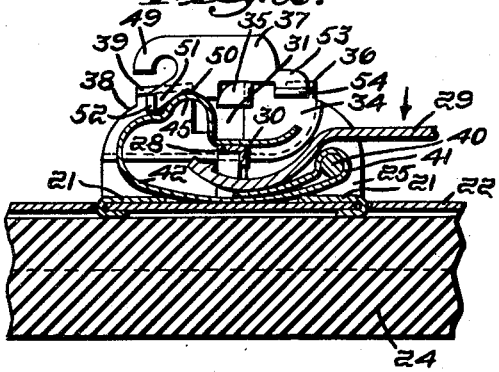
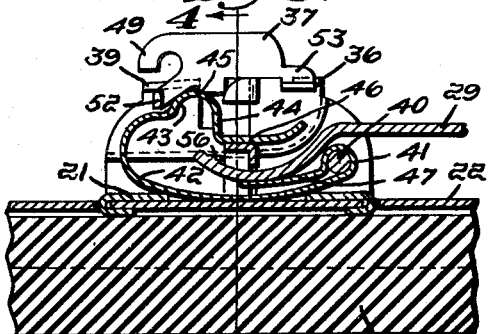
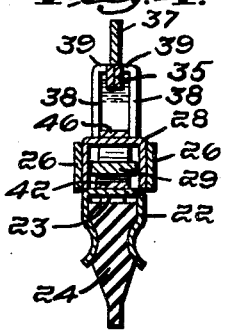
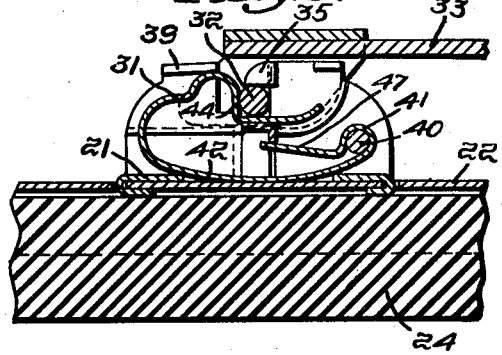
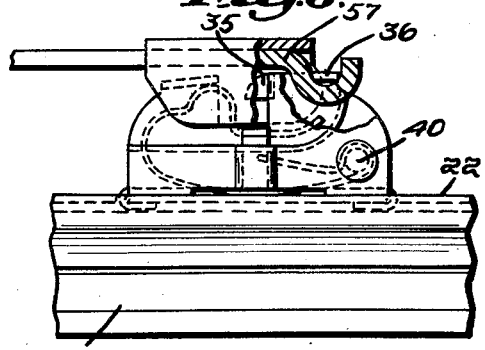
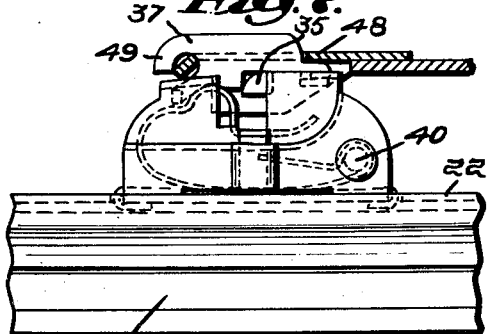
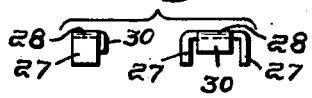
Inventor: Israel Nesson,
by Thomson & Thomson
Attorneys June 7, 1955        I. NESSON        2,709,825
CLIP FOR WIPER BLADES
Filed Dec. 8, 1951        2 Sheets-Sheet 2
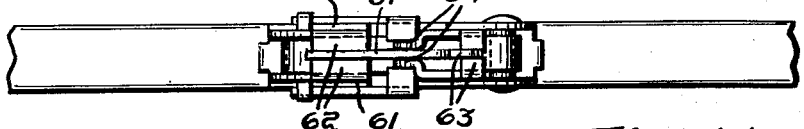
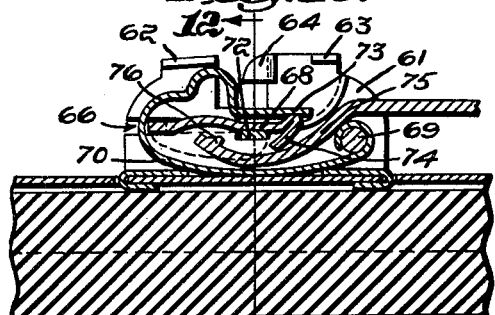
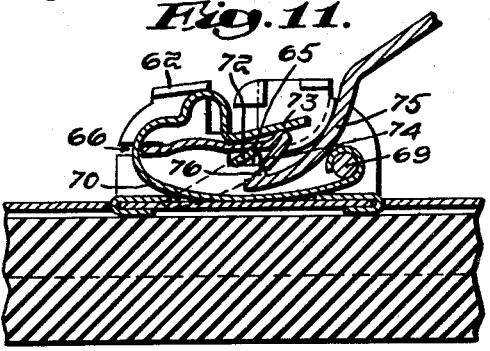
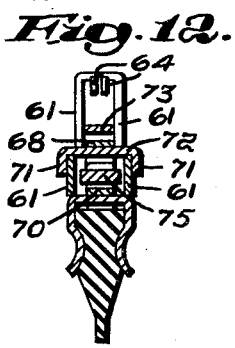
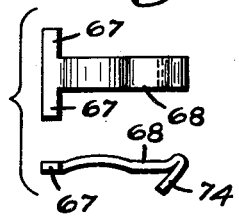
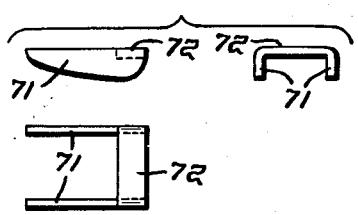
Inventor:
Israel Nesson,
by Thomson & Thomson
Attorneys

United States Patent Office 2,709,825
Patented June 7, 1955

2,709,825

CLIP FOR WIPER BLADES

Israel Nesson, Lynn, Mass., assignor to Max Zaiger, Swampscott, Mass.

Application December 8, 1951, Serial No. 260,705

11 Claims. (Cl. 15—250)

This invention relates to clips or connectors for windshield wiper blades, and pertains more particularly to improvements in a clip carried by a wiper blade for separably attaching the blade to wiper arms having ends of varying types. The subject matter of this application is a development of the connector disclosed in my pending application Serial No. 194,598, filed November 8, 1950 (Patent No 2,679,066, dated May 25, 1954), which was designed primarily for the attachment of an arm having a cross-bar or pin at its free end.

The principal purpose of the present invention is to provide a connector which will readily and properly accommodate the four common types of wiper arm ends, namely: the spoon type, the cross-bar type, the hook type, and the slotted terminal type. So-called universal clips or connectors have heretofore been devised, but such connectors have required special adapters or attachments which have been separately added in order that certain types of arms could be properly connected to the clip; and adjustment of the position of the clip on the blade has sometimes been necessary in order that the pivotal axis of the arm end could be properly centered with respect to the length of the wiper blade.

It is accordingly an object of this invention to provide a blade clip which, when sold to the consumer, may satisfactorily and conveniently receive in pivotally connected relation either of the four common types of wiper arms, with the arm end properly centered on the blade and without the necessity of adding attachments or adapters for certain arm end forms. Thus, the purchaser of a replacement blade equipped with the improved connector may use it satisfactorily with any standard wiper arm which has been installed adjacent the windshield of his motor vehicle or airplane, without the nuisance of adding adapters or adjusting the position of the clip on the back of the wiper blade.

Another object of the invention is to provide a truly universal clip of the character herein described, which may be easily attached to a blade holder, yoke or saddle, and which has novel means for pivotally connecting a wiper arm having an end of any of the aforesaid types.

A further object is to provide such a connector with a positive lock for preventing accidental removal of the spoon type arm end therefrom, and with a release bar for conveniently unlatching the locking device when it is desired to detach the arm from the clip.

Additional features and advantages of the improved clip will be apparent from the following description of the recommended embodiments of the invention shown in the accompanying drawings, and will be pointed out in the appended claims. It will be understood, however, that the structural details of the devices herein illustrated and described may be varied without departing from the essence of this invention as set forth in said claims.

In the drawings,

Fig. 1 is a fragmentary plan view of a windshield wiper blade equipped with the improved clip;

Fig. 2 is an enlarged longitudinal section through the clip and blade, showing the spoon type end of a conventional spring-pressed wiper arm inserted in the clip and disposed in normal operating position;

Fig. 3 is a view similar to Fig. 2, showing the disposition of the arm end and a spring associated therewith when inward pressure of the wiper arm is released;

Fig. 4 is a transverse section on line 4—4 of Fig. 3;

Fig. 5 is a view similar to Fig. 2, showing a cross-bar type arm end pivotally connected to the clip, after removing a hook plate therefrom;

Fig. 6 is a side elevation, with parts broken away and in section, showing a hook-type arm end connected to the clip of Figs. 1 and 2, after removing a hook plate therefrom.

Fig. 7 is a side elevation of the clip and blade portion of Figs. 1 and 2, showing a slotted type arm end attached to the hook plate of the clip;

Fig. 8 is a composite view showing a bridge-like catch and spring-stop, forming part of the clip, in side and end elevations;

Fig. 9 is a view similar to Fig. 1, illustrating a modified form of the clip;

Fig. 10 is a view similar to Fig. 2, showing a spoon type arm end releasably latched within the modified clip, after removing a hook plate therefrom;

Fig. 11 is a similar view showing the latch in released position to permit withdrawal of the arm end;

Fig. 12 is a transverse section on line 12—12 of Fig. 10;

Fig. 13 is a composite view showing the clip latch in plan and side views; and

Fig. 14 is a composite view showing the latch releasing lever in side, end and plan views.

In the particular embodiment chosen for the purpose of illustration in Figs. 1 to 8, the improved clip has base portions 21 rigidly mounted in the holder or shell 22 of a wiper blade, as by crimping end tabs 23 of the base through and under openings in the top of the shell. A flexible rubber wiper strip 24, of any common or desired form is gripped between the sides of the channeled holder, as shown in Fig. 4. If desired, the improved clip may be similarly mounted on a yoke or saddle member carried by the blade, as shown for example in Zaiger Patent No. 2,276,556, dated March 17, 1942.

The clip has substantially parallel sides 25 upstanding from the base portions 21, and portions 26 of the sides are pressed outwardly in the center of the clip to provide interior channels receiving the legs 27 of a bridge or latch member 28 which serves as a spring rest and, in the form indicated in Figs. 1-4, as a means for locking the end of a spoon type arm 29 between the sides of the clip. For that purpose, the saddle 28 has a depending flange 30 constituting a latch which prevents accidental disconnection of the spoon type end, as hereinafter explained in connection with Fig. 3.

The sides 25 are centrally apertured from the top of the clip to provide complemental slots 31 for receiving the pin 32 of a cross-bar type of arm end 33, as indicated in Fig. 5. The upstanding side portions 34 to the right of the slots 31, as shown in the figures, are provided with inwardly directed fingers 35 which meet in face-to-face relation and provide a central latch overhanging a portion of the chamber in which the cross bar 32 is received when inserted downwardly into the side recesses 31.

The cross bar is hooked under the latch members 35, as shown in Fig. 5. Said side portions 34 also have inwardly directed tongues 36 projecting from their upper edges and defining top flanges of the clip. The opposed ends of the flanges 36 are preferably spaced to provide a narrow slot for receiving a hook plate 37, as hereafter explained.

The upstanding side portions 38 to the left of the slots 31, as shown in the figures, are also formed with inwardly directed top flanges 39, the opposed ends of which are similarly spaced to provide a slot for receiving another portion of the plate 37.

A pin or rivet 40 suitably mounted between the clip sides 25 adjacent the right hand end of the clip, as shown in the figures, provides an anchorage for the bight portion 41 of a leaf spring 42 which is bent upon itself at the bight portion, then extends along the bottom of the clip, engaging the blade holder between the base portions 21, and then bends upwardly and rearwardly to form an outer shoulder 43 and an inner shoulder 44 defining an intermediate bow 45. A tail portion 46 of the spring rests upon the top of the bridge member 28, and the bow portion 45 normally engages the under side of the top flanges 39. The end portions 47 of the bight 41 extends under the top of the saddle and normally engages the depending latch 30 of the bridge (Fig. 5).

The hook plate 37 is removably assembled with the clip when a wiper blade equipped with the improved connector is placed on sale, but may be manually detached when it is not needed to secure the slotted type arm end 48 shown in Fig. 7. The member 37 consists of a metal blank having a hook 49 at one end, and having a notch 50 in its bottom edge, intermediate its ends. At one end of the plate, a bottom projection 51 has an offset tab 52; and at the opposite end, a bottom projection 53 has an offset tab 54 projecting in the opposite direction.

Hence, when the end portions 51 and 53 of the hook plate are slid into the slits between the top flanges 39 and 36 respectively, the tabs 52 and 54 engage under complemental top flanges, and are held in such engagement by pressure of the spring bow 45 in the base notch 50. The hook plate may be manually detached by pulling it lengthwise of the clip. The hook plate serves to attach the slotted type arm end 48 (Fig. 7), as aforesaid.

The spoon type arm end is inserted between the clip sides and beneath the top of the bridge 28, as shown in Figs. 2 and 3. In the former view, the parts are in normal operative position, with the spoon end depressing the spring end 47, under action of the conventional spring-pressed wiper arm. When that pressure is released, as by lifting the blade from the windshield, the spring end 47 forces the spoon end against the latch 30 (Fig. 3) and the usual small hook 56 at the end of the spoon end cannot pass the latch, so that the arm end is held against accidental detachment. Manual separation is accomplished by pressing on the arm end to depress the spring end 47 and permit the spoon end to be withdrawn below the latch 30.

The pin 32 of cross bar type arm end 33 is locked in place under the catch 35 by the shoulder 44 of the spring 42, as shown in Fig. 5. By pressing the arm and pin 32 to the left of the figure, the spring lock is released and the arm end may be removed from the clip.

The hook type arm end 57 is applied to the clip by engaging its hook under the top flanges 36 of the clip, as shown in Fig. 6.

In each of these optional modes of attaching the four common types of arm ends, the pivotal center of the arm end is disposed approximately at the longitudinal center of the clip, thereby properly balancing the arm pressure along the length of the wiper blade.

The optional form of clip illustrated in Figs. 9 to 14 is generally similar in construction and purpose to the embodiment of Figs. 1 to 8, but is equipped with a modified, tiltable latch and a release lever associated therewith, for removably securing the spoon type arm end within the connector.

The sides 61, the top flanges 62 and 63 and the finger latches 64 of the modified form are substantially the same as the corresponding parts of the clip previously described, except that the sides 61 need not have the embossed channels 26 of the previous embodiment, but are provided with top notches 65 (Fig. 11) to receive the release lever hereinafter described, and with end slots 66 to receive the cross bar 67 of a latch member 68.

The modified clip is mounted on the wiper blade in the same manner as previously explained, and is equipped with a spring anchoring pin 69 and spring 70 which correspond substantially to the related elements of the devices shown in Figs. 1 to 7. The clip receives and secures the four types of arm ends heretofore described, as previously explained. The detachable hook plate 37 is shown in Fig. 9 but has been removed from the clip in Figs. 10–12, inasmuch as the modified structure therein illustrated relates primarily to the means for retaining a spoon type arm end within the clip.

The release lever of the optional embodiment, as best shown in Fig. 14, consists of a pair of lever arms 71 connected by a flat cross piece or bridge 72. The bridge is received in the notches 65 of the sides of the clip, and the arms 71 extend along the outer surfaces of said sides where they are conveniently accessible to the fingers for operating the lever to release the latch 68.

The latch 68 is disposed between the sides of the clip, with its cross bar 67 received in the end slots 66 and having slight tilting movement therein, and with its body portion engaging the top of the bridge 72. The end portion 73 of spring 70 bears on the latch 68 and yieldingly presses the latch to its operative position (Fig. 10) in flatwise engagement with the flat bridge of the release lever. When either or both of the lever arms is manually moved toward the base of the clip, the bridge 72 is swung angularly to lift the latch 68, as shown in Fig. 11.

The free end of the latch is formed with a depending finger 74 which, when the latch is in the position of Fig. 10, prevents removal of the inserted end 75 of the spoon type wiper arm; said arm end conventionally having a stud or projection 76 which would strike the latch finger 74 and thus positively prevent further outward movement of the arm end, while the latch is in operative or locking position. When the latch is lifted to unlocking position (Fig. 11), the latch finger is raised sufficiently to permit the stud of the arm end to pass under the finger 74, as the arm end is manually withdrawn from the clip.

It will be evident that the latch snaps back to operative position when the lever arms 71 are released or free, under action of the spring 70, 73. It will also be apparent that the spring for normally holding the latch in operative position may take various forms and may be differently disposed within the clip, and that the form and arrangement of the release lever may also be varied, within the scope of this invention which, in one aspect, provides a positive, spring-pressed latch for the end of a conventional spoon type wiper arm equipped with a projecting stud, and a lever for moving the latch to inoperative position.

I claim:

1. A wiper blade having a clip adapted for connecting the blade to wiper arms having ends of the spoon type, cross-bar type, hook type or slotted terminal type, the clip comprising spaced, substantially parallel sides each having longitudinally spaced pairs of inwardly directed flanges at the top thereof, a top recess disposed intermediate said spaced flanges, and a latching finger near the top of the clip, overhanging an interior space adjacent said recesses, a latch member disposed intermediate said sides near the base of the clip, a hook plate removably secured to the top of the clip, each pair of top flanges having their opposed ends spaced to receive portions of said hook plate, and a spring disposed between the clip sides and arranged to cooperate with said latching fingers and said latch member to attach the cross-bar type arm end and the spoon type arm end, respectively, to the clip, and to engage said hook plate and restrain detachment thereof while the hook plate is used to attach the slotted terminal type arm end.

2. A clip as described in claim 1, said latch member being fixed between the clip sides, and a portion of the spring being disposed to engage the spoon type arm end and press it toward said latch member.

3. A clip as described in claim 1, said latch member being movable, and a portion of the spring being disposed to engage the latch member and press it toward the spoon type arm end.

4. A clip as described in claim 1, said latch member being hinged between the clip sides and having a catch portion on a movable portion thereof, a portion of the spring being disposed to engage said latch member and press its catch portion toward an inserted spoon type arm end having a stud thereon, and a lever for manually moving the latch member against such spring pressure.

5. A clip as described in claim 4, said lever comprising a bridge extending transversely of the clip, and an exterior arm accessible to the fingers.

6. A wiper blade having a clip adapted for connecting the blade to wiper arms having ends of the spoon type, cross-bar type, hook type or slotted terminal type, the clip comprising spaced, substantially parallel sides each having longitudinally spaced pairs of inwardly directed flanges at the top thereof, a hook plate removably secured to the top of the clip, each pair of said top flanges having their opposed ends spaced to receive portions of said hook plate, a latch member in said clip, and a spring in said clip arranged to cooperate with said latch member and also to engage portions of said hook plate and restrain detachment thereof.

7. A wiper blade having a clip adapted for connecting the blade to wiper arms having ends of the studded spoon type, cross-bar type, hook type or slotted terminal type, the clip comprising spaced, substantially parallel sides and longitudinally spaced top portions, the space between said top portions being adapted to receive the cross-bar type of arm end, and one of said top portions being adapted to be engaged by the hook type arm end, a hook plate removably secured to the clip and adapted to engage the slotted terminal type of arm end, a latch member disposed between said clip sides and adapted to be engaged by the stud of a spoon type arm end inserted between the clip sides beneath the latch member, and means comprising a spring disposed in said clip and being constructed and arranged to retain the cross-bar type end in said space, to hold said hook plate on the clip, and to lock said spoon type end within the clip.

8. A wiper blade having a clip as described in claim 7, said latch member being movable in the clip from a locking position to hold said spoon type arm end against removal to an unlocking position freeing said end for removal, said spring yieldingly holding the latch member in locking position, and means for manually moving the latch member to unlocking position.

9. A wiper blade having a clip adapted for connecting the blade to wiper arms having ends of the studded spoon type or cross-bar type, the clip comprising spaced, elongate, substantially parallel sides and longitudinally spaced top portions, the space between said top portion being adapted to receive the cross-bar type of arm end, a latch member disposed between said sides and having a depending finger adapted to be engaged by the stud of a spoon type arm end inserted between the clip sides beneath the latch member, and means comprising a spring disposed in said clip and being constructed and arranged to lock the cross-bar type end in said space and to lock the spoon type end under said latch member.

10. A wiper blade having a clip as described in claim 9, said latch member being movable within the clip from locking to unlocking position, and said spring normally holding said member in locking position, and means for manually moving the latch member to unlocking position.

11. A wiper blade having a clip as described in claim 10, a lever being associated with the latch member for moving said member to unlocking position, the lever comprising a bridge portion extending transversely of the clip and engaging a portion of said spring, and an arm connected to said bridge portion and extending outside the clip, whereby the arm may be manually actuated partially to rotate said bridge portion and move said spring.

References Cited in the file of this patent

UNITED STATES PATENTS

| | | |
|---|---|---|
| 2,156,506 | Marcclivio | May 2, 1939 |
| 2,160,246 | Zaiger | May 30, 1939 |
| 2,260,905 | Horton | Oct. 28, 1941 |
| 2,417,575 | Thomson | Mar. 18, 1947 |
| 2,508,056 | Zaiger | May 16, 1950 |
| 2,548,090 | Anderson | Apr. 10, 1951 |